June 26, 1945.  R. A. GOEPFRICH ET AL  2,379,144
BRAKE
Filed May 27, 1942  2 Sheets-Sheet 1
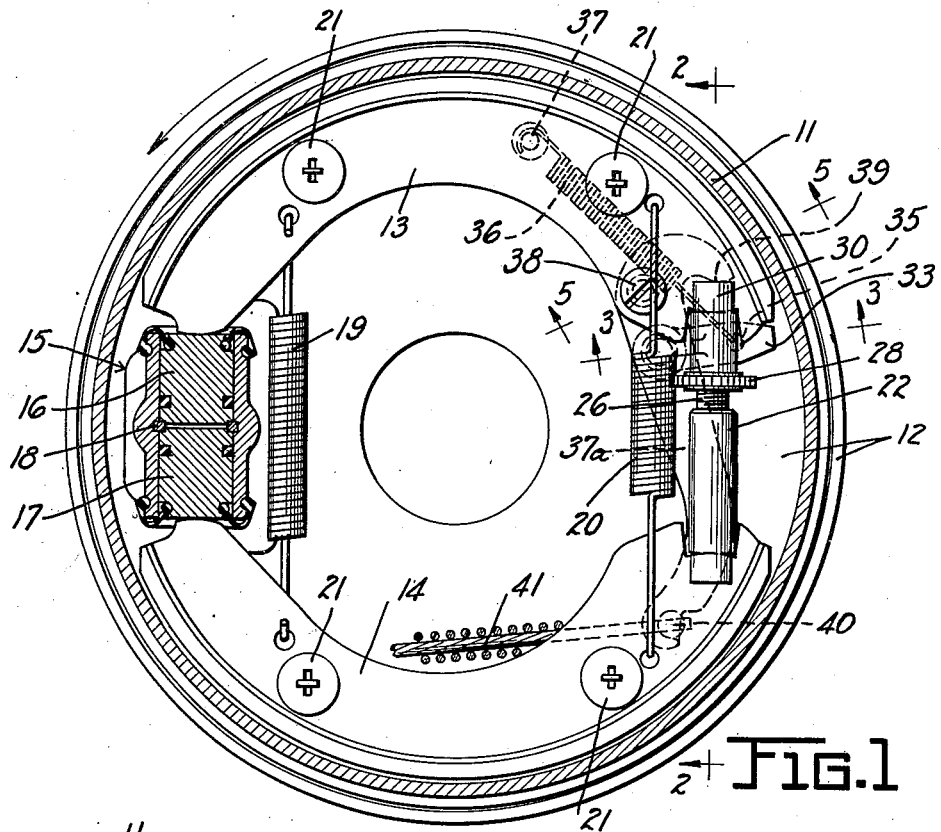
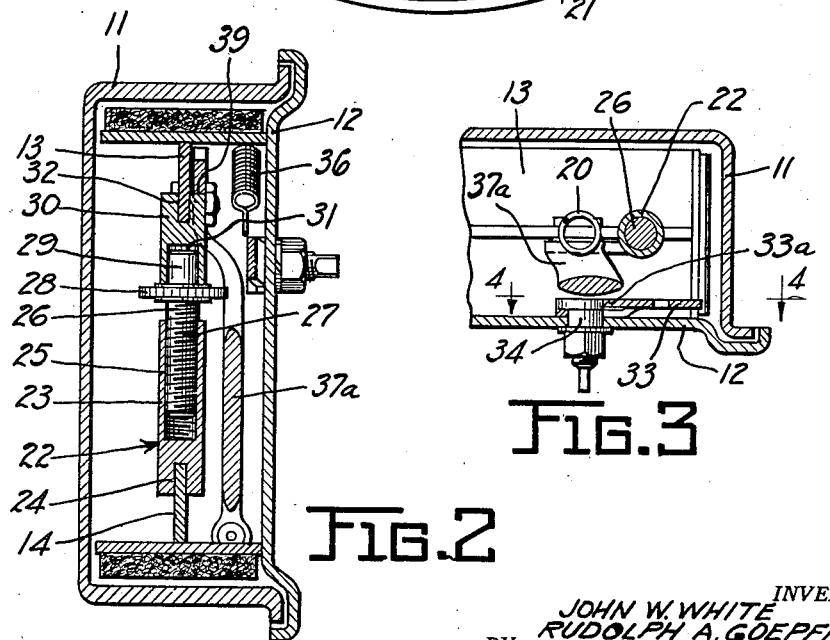
INVENTOR.
JOHN W. WHITE
RUDOLPH A. GOEPFRICH
BY
M. W. McConkey
ATTORNEY.

INVENTOR
JOHN W. WHITE
RUDOLPH A. GOEPFRICH
BY
M. W. McConkey
ATTORNEY

Patented June 26, 1945

2,379,144

UNITED STATES PATENT OFFICE 2,379,144

BRAKE

Rudolph A. Goepfrich, South Bend, Ind., and John W. White, Van Nuys, Calif., assignors to Bendix Aviation Corporation, South Bend, Ind., a corporation of Delaware Application May 27, 1942, Serial No. 444,636

4 Claims. (Cl. 188—106)

This invention pertains to brakes and particularly to the type of brakes employing a plurality of connected shoes which are fully floating in the sense that they shift to anchor through one shoe or another depending upon the direction of rotation of the brake drum.

An object of this invention is to provide, in a brake having a pair of shoes and having an adjusting strut between the shoe ends, mechanism for spreading the shoes by utilizing the adjusting strut as a shoe spreading strut, this brake applying mechanism being preferably used as the parking brake or emergency brake applying mechanism in addition to service brake applying means. A second object of the invention is to position the shoes of a full floating brake horizontally i. e. with the ends of each shoe on a horizontal line, and to provide means for supporting the shoes. The advantage of so positioning the shoes is that it simplifies the problem of keeping arcuate brake shoes concentric with a circular brake drum.

Other objects are to so arrange the parking or emergency brake applying mechanism that a substantially horizontal pull may be exerted thereon by a cable or other means connected to an operator operated member, and to provide parking or emergency brake applying mechanism which is adjusted by an adjustment of the service brake applying mechanism and in which the slack need not be taken up separately from the service brake.

Other objects and advantages of my invention will become apparent during the following description, in which reference will be had to the accompanying drawings:

Fig. 1 is a vertical section of a brake applying assembly taken on a plane just inside the head of the brake drum and showing my improved brake;

Fig. 2 is a section taken on the line 2—2 of Fig. 1;

Fig. 3 is a section taken on the line 3—3 of Fig. 1;

Figure 4:
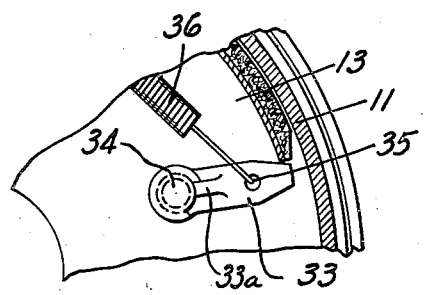
Fig. 4 is a section taken on the line 4—4 of Fig. 3.
Figure 5:
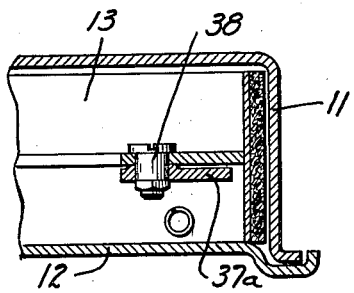
Fig. 5 is a section taken on the line 5—5 of Fig. 1.

The brake shown in Figures 1-5, inclusive, comprises generally a rotatable brake drum 11, a non-rotatable support or backing plate 12, and two arcuate brake shoes 13 and 14 so positioned that the two ends of either shoe lie on a substantially horizontal line. A hydraulic motor 15 may be positioned between the shoes at one end thereof for applying a spreading force thereon. As shown the hydraulic motor also serves the purpose of anchoring the shoes during application of the brake. The anchoring is accomplished through the pistons 16 and 17 of the motor, an anchoring ring 18 positioned in a groove inside the cylinder, and the hydraulic motor casing which is secured to the support 12. A plurality of return springs 19 and 20 tend to draw the shoes toward one another to position them radially of the brake drum, and a plurality of hold-down mechanisms 21 position the shoe webs laterally.

Between the ends of the shoes opposite the hydraulic motor 15, adjusting strut or link 22 is provided to connect the shoes. The adjusting strut 22, which can be seen clearly in Fig. 2, is of a type well known to the art and comprises a sleeved member 23 forked at 24 to receive the web of shoe 14 and internally threaded along its internal surface 25; a screw 26 having a threaded portion 27 entering the sleeve member 23, a serrated head 28 which can be turned to change the position of the screw relative to the sleeve member 23, and a guide portion 29 on the side of the head opposite the threaded stem 27; and a screw supporting member 30 having a recess 31 to receive the guide portion 29 of the adjusting screw and a notch 32 to receive the web of shoe 13.

The brake thus far described is of a type well known to the art and its operation need not be described in detail. Suffice it to say that, depending upon the direction of drum rotation at the time the hydraulic motor 15 is actuated, one of the shoes anchors against the motor and the other shoe exerts an applying force on the anchoring shoe through the adjusting strut 22. When the brakes are released and it is desired to adjust the position of the shoes to compensate for shoe lining wear, the adjusting screw 26 may be rotated to increase the distance between the ends of the shoes. The brake described thus far does differ in at least one respect from other brakes operating on similar principles but not in a like manner, in the respect that the hydraulic applying motor is positioned at one side of the drum and the shoes are positioned horizontally. This has the advantage of making it possible for the springs 19 and 20, by drawing the shoes toward one another, to hold them in their proper position concentric with the brake drum. Should the brake shown and described herein be positioned vertically, it would be extremely hard to keep the shoes from dropping downward from the influence of gravity and thereby disturbing their concentricity. Because the shoes are horizontal and at the same time are fully floating, it is necessary to provide a support for the shoes at the end of the shoes away from the anchor and adjacent the adjusting strut 22. The support which is shown in detail in Figs. 3 and 4 comprises a lever 33 pivoted on a pin 34 fastened on the backing plate, connected at 35 to a spring 36 which is also connected by a pin 37 to the backing plate. The lever has an integral nib 33a which extends into an arcuate groove cut in the head of pivot pin 34. The washer is fixed against rotation about the pivot in order that contact of the nib with the ends of the arcuate groove will limit movement of the nib. In the position shown in Figs. 1 and 4, the nib is held by the spring against the upper end of the groove. The pivot pin 34 may be so positioned as to initially adjust the position of the shoes after which it is held tightly in place by suitable means. The positioning lever 33 contacts the rim of shoe 13 and thereby prevents the weight of shoe 13 from pulling it vertically downward, and through spring 20, prevents the weight of shoe 14 from pulling it downward.

My novel emergency or parking brake applying means which exerts force through the adjusting strut 22 comprises a lever 37a pivoted at 38 on shoe 13 and contacting at 39 the upper end of the adjusting strut 22. Lever 37a extends downwardly toward the lower part of the brake assembly to be connected at 40 to the end of a brake applying cable 41. When the cable 41 is put under tension to apply the emergency or parking brake it draws the lower end of lever 37a toward the left (as seen in Fig. 1) thus exerting a force through pivot 38 tending to move shoe 13 against the brake drum and a force through adjusting strut 22 tending to move shoe 14 against the brake drum. During such emergency application, the shoes both pivot on the pistons of hydraulic motors 15 and apply as in an ordinary non-servo brake. Because the various parts of the brake are positioned as shown, it is particularly easy and convenient to apply the parking or emergency brake. This is true inasmuch as a substantially horizontal applying force may be exerted through cable 41 to swing lever 37a. Lever 37a without obstructing the center of the brake assembly exerts an applying force effective to spread the brake shoes. Because the parking or emergency brake is applied through the adjusting structure, adjusting the position of the shoes by operating the strut does not develop any slack in the parking brake applying mechanism, but instead automatically accomplishes adjustment of the parking brake whenever the position of the shoes is changed to cause the service brakes to be effective without excessive travel of the pedal or other operator operated member.

Figure 6:
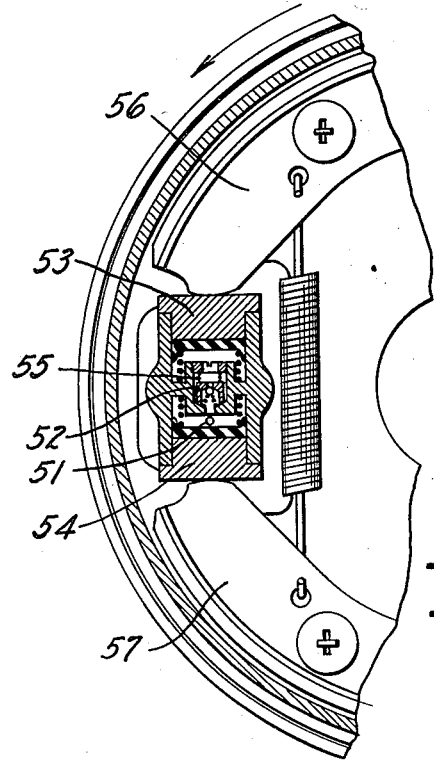
Fig. 6 is a section disclosing a modification of the hydraulic motor applying device of Fig. 1.

In Fig. 6 is shown a modified hydraulic motor. A valve arrangement is used to make the primary piston move before the secondary piston. The inlet to the motor is shown at 51. Because of the presence of a valve member 52 between the inlet and piston 53, hydraulic fluid under pressure admitted to the motor will move piston 54 before it moves piston 53, said piston 53 not being subjected to pressure until such pressure overcomes a spring 55. Assuming the direction of rotation of the brake drum to be that indicated by the arrow in Fig. 6, shoe 56 will be the anchoring or secondary shoe and shoe 57 will be the applying or primary shoe. With the arrangement shown, the secondary shoe will never leave its anchored position during forward rotation of the brake drum.

Being aware of the possibilities of modifications in the particular structures herein described without departing from the fundamental principles of our invention, we do not intend that their scope be limited except as set forth by the appended claims.

We claim:

1. A brake comprising a pair of horizontally extending shoes, a vertically extending hydraulic motor between the shoes at one end thereof adapted to exert an applying force on the shoes, a vertically extending adjusting strut between the shoes at the other end thereof, means at the motor end of the shoes for receiving the anchoring torque of the shoes, and mechanical means for applying the shoes including a lever pivoted on one of the shoes and on one end of the adjusting strut to exert a spreading force on the shoes through its pivot and through the adjusting strut.

2. A brake comprising a rotatable brake drum, two horizontally extending brake shoes adapted to cause friction tending to impede rotation of the drum, said brake shoes together constituting a full floating friction element, anchoring and applying means between the ends of the shoes at one side of the drum, a floating adjusting strut between the shoes at the other side of the drum, a lever pivoted on one of the shoes and on one end of the adjusting strut, a cable extending substantially horizontally adapted to swing the lever to spread the shoes at the adjusting strut side of the drum, and means at the adjusting strut side of the drum for vertically supporting the ends of the shoes and the adjusting strut.

3. A brake comprising a rotatable brake drum, a fixed backing-plate, two horizontally extending brake shoes adapted to cause friction tending to impede rotation of the drum, said brake shoes together constituting a full floating friction element, anchoring and applying means between the ends of the shoes at one side of the drum, a floating adjusting strut between the shoes at the other side of the drum, a lever pivoted on the backing-plate, and in contact with the end of the upper shoe, and a spring in tension between the lever and a projection on the backing-plate, the movement of said lever about its pivot being limited.

4. A brake comprising a rotatable brake drum, two arcuate brake shoes adapted to cause friction tending to impede rotation of the drum, anchoring and applying means between the shoes at one end thereof, a floating adjusting strut located between the shoes at the opposite end thereof and pivotally connected to both of said shoes, the two shoes and adjusting strut thereby constituting a full floating friction element, a lever pivoted on one of the shoes and on one end of the adjusting strut, and means for swinging the lever to cause relative movement between the adjusting strut and the shoe on which said lever is pivoted, thereby spreading the unanchored ends of the shoes.

RUDOLPH A. GOEPFRICH.
JOHN W. WHITE.